Oct. 30, 1923.

L. URIGA

AGRICULTURAL IMPLEMENT

Filed July 10, 1920

Inventor:
Leopold Uriga
By Lawrence Langner
Attorney

Oct. 30, 1923.

L. URIGA 1,472,102

AGRICULTURAL IMPLEMENT

Filed July 10, 1920   2 Sheets-Sheet 2

Inventor:
Leopold Uriga
By Lawrence Langner
Attorney.

Patented Oct. 30, 1923.

1,472,102

UNITED STATES PATENT OFFICE.

LEOPOLD URIGA, OF WITTENBERGE, GERMANY, ASSIGNOR TO FIRM OF LANDWIRT-SCHAFTLICHE MASCHINENFABRIK, OF WITTENBERGE, GERMANY.

AGRICULTURAL IMPLEMENT.

Application filed July 10, 1920. Serial No. 395,414.

*To all whom it may concern:*

Be it known that I, LEOPOLD URIGA, engineer, a citizen of the German Republic, residing at Wittenberge, Bezirk Potsdam, Lenzener Chaussee 45/46, Germany, have invented certain new and useful Improvements in Agricultural Implements (for which I have filed application in Germany, U 6695, May 26, 1919, Patent Number 346,640, and U 6956, March 2, 1920, Patent Number 347,639), of which the following is a specification.

My invention relates to an agricultural implement operated by man power, and in its preferred embodiment comprises two foot plates, connected to a ground working tool, preferably a plowshare, and articulated to a propelling rod or lever in such a manner that the implement may be moved forwardly by merely shifting the weight of a body alternately from the one foot-plate on to the other in consonance with the movement of the lever by the operative. Thus the forward movement of the implement is effected by a motion not unlike that carried out when skeeing, in combination with the reciprocating motion of the driving lever.

Both foot-plates are preferably connected with agricultural tools.

According to this invention, the foot-plates or at least one of them are preferably constructed so as to constitute depressible pedals which assist the locomotion of the implement.

Two embodiments of my invention are shown by way of example in the accompanying drawing, in which.

Figure 4:
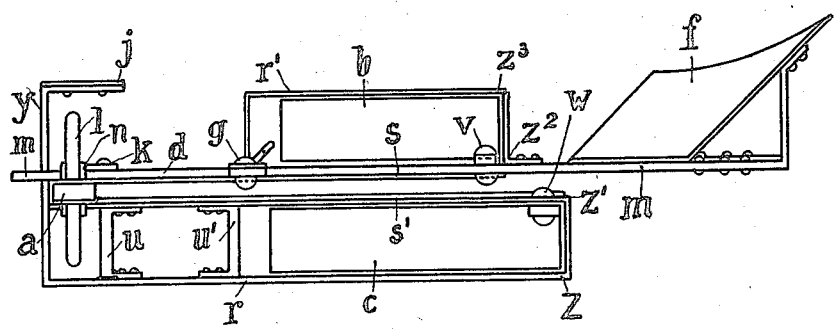

Fig. 4 a plan view thereof.

Figure 1:
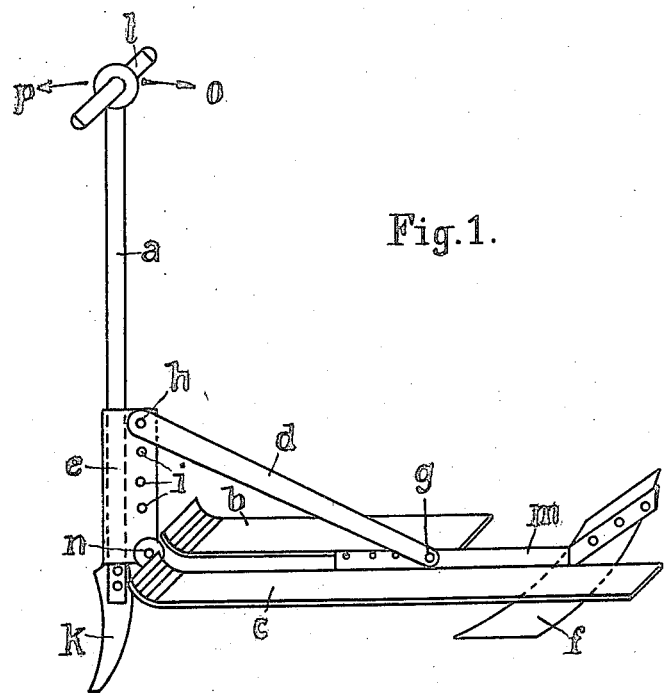
Figure 1 is a side view of one form of the invention.
Figure 2:
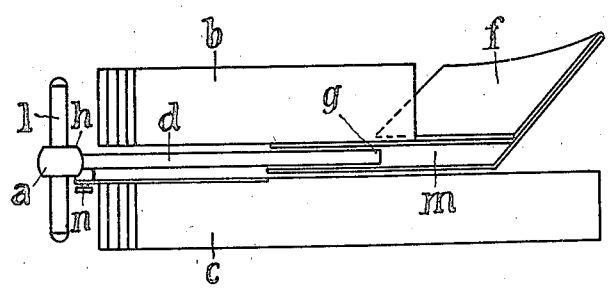
Fig. 2 is a plan view of the same.

The implement in the construction according to Figs. 1 and 2 comprises a lever $a$ and the two foot-plates $c$ and $b$ which are bent up toward the front end in the manner of runners or sleds. The lever $a$, which is suitably provided with a handle $l$ traverses a sleeve $e$, while at its lower end it is connected to an advance cutter $k$. By means of a pivot $n$, connection is established between the foot-plate $c$ and the sleeve $e$. This latter is provided with a series of holes $i$ in which, as circumstances may require, there may be inserted a pin $h$, pivotally connecting a link $d$ with the sleeve $e$. The said link is also pivoted by means of the pin $g$ with the pedal $b$ to which a bar $m$, supporting the plowshare $f$, is rigidly fixed. The operation of the improved implement is as follows:—

The implement is set up on the ground, in the manner shown in the drawing, namely so that pedals $b$ and $c$ will come to be disposed adjacent each other. The operative then steps onto the pedals $b$ and $c$ and brings most of the weight of his body to bear on pedal $c$, so that the advance cutter $k$, will sink into the ground. Then, though without in any way lessening the weight he has brought to bear on pedal $c$, the operative pushes the lever $a$ forwardly in the direction indicated by the arrow $p$. The result will be that by the intervention of link $d$, the pedal $b$, and therewith the plowshare $f$, will be drawn forward, the pivot $n$ serving as a fulcrum because of the operative's weight bearing the pedal $c$ against the ground and because of the shape of the advance cutter $k$ which offers considerable resistance to backward motion. After this, the operative shifts the weight of his body to pedal $b$, pulling the lever $a$ toward his body as indicated by the arrow $o$. During the latter operation, the pedal $b$ bearing against the ground under the operative's weight and the plowshare $f$, which offers a considerable resistance to rearward motion through the link $d$ connected thereto cause the lever $a$ to fulcrum on the pivot $h$ and move the advance cutter $k$ and the pedal $c$ forwardly. The operative then shifts the main part of the weight of his body to his left foot and consequently to pedal $c$, and pushes the lever $a$ forward in the direction of $p$, so that the plowshare $f$ along with the pedal $b$ is once more moved forward in the manner above described, whereupon the operations are repeated. A fact which materially assists this operation is that during the first part of the motion executed by lever $a$ in the direction indicated by $p$, the reaction effect arising against this motion is transmitted by the operative's foot onto the pedal $c$ and is utilized in the form of pressure for this said pedal.

In this way the advance cutter $k$, connected to pedal $c$, and the plowshare $f$ connected to pedal $b$, alternately execute a regular advancing action, the operative's two feet constantly retaining their normal position, as they are required to execute no lifting work whatsoever.

Figure 3:
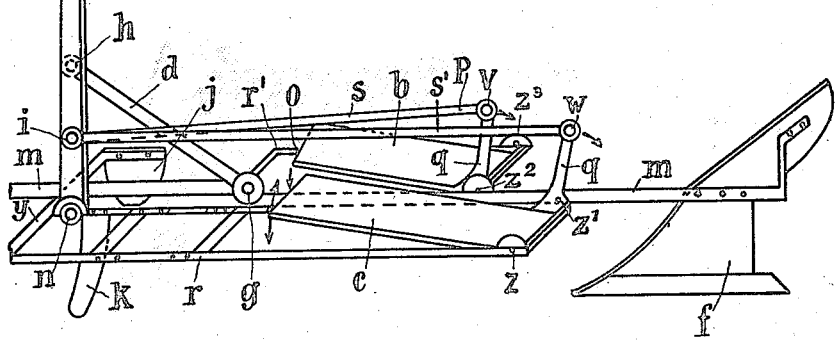
Fig. 3 is a perspective view of a modified form of the invention.

The implement disclosed in the construction according to Figs. 3 and 4, is provided with an oscillating operating lever $a$ and two foot-plates $b$ and $c$. The plowshare $f$ is supported by a bar $m$ connected with the foot-plate $b$, connection between said bar $m$ and the lever $a$ being established by a link $d$ with the aid of the link pins $g$ and $h$. The lower end of the lever $a$ is adapted to support the advance cutter $k$, while the upper end of the lever is provided with a handle rod $l$. Thus far the implement essentially corresponds to that described in connection with the embodiment shown in Figs. 1 and 2.

In this modified form of construction however, the foot plates $b$ and $c$ or at least one of them constitute propelling pedals. To this end, they are connected with pedal frames $r$ and $r'$ which are adapted to constantly rest on the ground. The frame $r$ is connected by a pivot $n$ with the lever $a$, and the somewhat shorter frame $r'$ is connected by a pivot $g$ with a link $d$ and thus to the lever $a$. Frame $r$ in addition is provided with a cross bar $y$ supporting a gauge or guide $j$, which serves to determine the width of the work and to guide the implement.

The pedal $b$ is adapted to swing on the frame $r'$ about the pivots $z^2$ and $z^3$, whereas pedal $c$ is arranged to oscillate on the frame $r$ about pivots $z$ and $z'$. Each of these pedals are rigidly connected to a lever $q$ disposed at approximately a right angle to the same. The lever $q$ of pedal $b$ is connected by means of a pivot pin $v$ with a connecting rod $s$, and the other lever $q$ of pedal $c$ is connected by means of a pivot pin $w$ with a corresponding connecting rod $s'$. Both these connecting rods are pivoted on the oscillating level $a$ by means of a pin $i$.

The operation of the device is as follows:

When the implement is in the central position indicated in Fig. 3, the operative takes his stand on the pedals $b$ and $c$ in such a manner that the weight of his body will be almost exclusively brought to bear upon the right hand pedal $b$. As a result, this pedal will be depressed, and will lodge itself on the ground within the frame $r'$. During this downward motion of the pedal, the connecting rod $s$ tends to force the lever $a$ forward in the direction indicated by the arrow $p$. This movement however is resisted by the link $d$ connecting the pivot $h$ of the lever $a$ with the bar $m$ held against advancing movement by the plowshare $f$ and by the weight of the operative. If now the operative by means of the hand bar $l$, draws the lever $a$ toward his body (indicated by the arrow $o$), the pivot $h$ remains substantially at the same point, and constitutes a stationary fulcrum around which the lower end of the lever $a$ is enabled to swing forwardly and to move the advance cutter $k$ forward, which movement is assisted by the forward pressure of the connecting rod $s$. By these means the frame $r$ is likewise propelled forward, and, as the connecting rod $s'$ by its connection $i$ does not move forward to the same extent to which the frame $r$ advances the upper end of the respective lever $q$ is moved back, the front end of pedal $c$ being raised in consequence.

After this the operative shifts the weight of his body onto the left hand pedal $c$, which latter is thereby depressed, so that it bears against the ground within the frame $r$. At the same time, the connecting rod $s'$ tends to force the lever $a$ forwardly (in the direction of the arrow $p$), while simultaneously the operative has also pushed the handle $l$ forward. During this operation, the advance cutter $k$, which owing to its surface pressure in connection with the surface friction exerted by the pedal $c$ is secured in its position, acts as a positive resistance, and the lever $a$ will oscillate about the pivot $n$ as around a fulcrum, so that, by the intervention of the link $d$, the plowshare $f$, along with the frame $r'$, and the pedal $b$, is propelled forward, the bar $m$ sliding along in a suitable guide fixed to the lever $a$ or the cross bar $y$. As the pivot $h$ is disposed at a greater distance from the temporary fulcrum $n$ than the pivot $i$, the frame $r'$, along with the pivots $z^2$, and $z^3$, will be drawn forward for a greater extent by the link $d$ than the pivot $v$ by the connecting rod $s$. The pedal $b$ is thus raised, whereupon the operation is repeated.

The invention may be carried out in manifold other ways. Thus, in the place of the connecting rods hereinbefore indicated, use may also be made of a gearing in combination with rope and chain drives. Also instead of pedals swinging in an angular direction, pedals may be arranged moving in a parallel sense and having a higher lift, and the like.

Moreover, in the place of two controlled pedals, it may be found that in certain cases one will suffice; notwithstanding, the arrangement of two pedals is at present preferred.

In the embodiment of the invention hereinbefore described, the locomotion of the implement effected by the lever is directly assisted by means of the pedals, and this in quite a particular manner. For, while in the case of ordinary means of conveyance, such as bicycles, the load embodied by the person operating the machine is directly conveyed by the treading of the pedals, this contingency does not arise in the case of the implement in accordance with the present invention, but rather the weight of the body of the operative remains resting on the pedal that happens to be depressed for the time being, and the stroke of the pedal is only employed to propel a subsidiary load, say, that of a plowshare or advance cutter whereupon the bodily weight of the operative is subsequently carried forward as he shifts his body from one pedal onto the other.

I claim as my invention:

1. In an agricultural implement, the combination of a pair of drag-sleds, each adapted to receive the weight of the operative, a ground working tool connected with one of said drag-sleds, and means comprising a propelling lever interconnecting said drag-sleds adapted to be oscillated by the operative, for causing said drag-sleds to alternately advance.

2. In an agricultural implement, the combination of a pair of drag-sleds, a ground working tool connected with one of said drag-sleds and means comprising a propelling lever interconnecting said tool and drag-sleds adapted to be oscillated by the operative, the drag-sled associated with said tool by the weight of the operative pressing it against the ground, holding its tool against movement while the other drag-sled is advanced upon the movement of the propelling lever in one direction, and the other drag-sled being held against backward movement when the rod is oscillated to advance the tool over the ground.

3. In an agricultural implement, the combination of a pair of ground tools, a drag-sled connected to each tool and each adapted to receive the weight of the operative; and means comprising a propelling lever interconnecting said tools and drag-sled adapted to be oscillated by the operative, the drag-sled associated with one of said tools by the weight of the operative bearing it against the ground holding its tool against movement while the other tool is advanced upon the movement of the propelling lever in one direction, and the other drag-sled holding the other tool against advanced movement when the rod is oscillated to advance the first tool over the ground.

4. In an agricultural implement, the combination of front and rear ground tools; a propelling lever connected to said front tool and adapted to be manually operated; and means whereby the rear tool is pivotally connected to said lever comprising a link connected to the lever and to the rear tool for causing the tools to be drawn one after the other through the ground alternately upon the oscillation of said lever, the tool not being drawn constituting the purchase for the implement in advancing the other tool.

5. In an agricultural implement, the combination of front and rear ground tools; a propelling lever connected to said front tool and adapted to be manually operated; means whereby the rear tool is pivotally connected to said lever comprising a link connected to the rod and to the rear tool for causing the tools to be drawn one after the other through the ground alternately upon the oscillation of said lever, the tool not being drawn constituting the purchase for the implement in advancing the other tool.

6. In an agricultural implement, the combination of ground engaging means; and means comprising a propelling lever adapted to be manipulated by the operative and a pair of foot-plates each of which is adapted to receive the weight of the operative whereby upon the operation of the propelling lever and the shifting of the weight of the operative from one foot-plate to the other the implement is caused to be moved forward.

7. In an agricultural implement, the combination of ground engaging means; and means comprising a propelling lever adapted to be manipulated by the operative and a pair of foot-plates, each of which is adapted to receive the weight of the operative whereby upon the operation of the propelling lever and the shifting of the weight of the operative from one foot-plate to the other the implement is caused to advance, one of said ground engaging means being a ground working tool and being supported by one of the foot-plates.

8. In an agricultural implement, the combination of ground engaging means; and means comprising a propelling lever adapted to be manipulated by the operative and a pair of foot-plates, each of which is adapted to receive the weight of the operative whereby upon the operation of the propelling lever and the shifting of the weight of the operative from one foot-plate to the other the implement is caused to advance, at least one of said foot-plates being in the form of a depressible pedal the lowering movement of which assists in advancing the implement upon the operation of the propelling lever.

9. In an agricultural implement, the combination of ground engaging means; a propelling lever adapted to be manipulated by the operative; a pair of foot-plates, each of which is adapted to receive the weight of the operative, said ground engaging means being in the form of a ground working tool and being supported by one of said foot-plates, at least one of said plates being a depressible pedal; and means whereby the depressible pedal in being depressed in conjunction with the operation of the propelling rod causes the implement to advance and the ground working tool to be drawn through the ground.

10. In an agricultural implement, the combination of ground working tools; a propelling lever adapted to be manipulated by the operative; a pair of depressible pedals, each of which is adapted to receive the weight of the operative and each adapted to be connected to one of said ground working tools; and means whereby the depressible pedals in conjunction with the manipulations of the lever cause the ground working tools to alternately advance through the ground.

11. An agricultural implement operated by man-power, having, in addition to a working and propelling lever bearing up against a foot-plate, pivotally connected thereto a second foot-plate pivotally connected to said lever at a higher point, said points of pivotal connection acting alternately as stationary fulcrums for the lever motion.

12. In an agricultural implement, the combination of a ground working tool; a ground engaging foot-plate; and a propelling handle adapted to be manipulated by the operative for causing the ground working tool and the ground engaging foot-plate to alternately advance.

13. In an agricultural implement, the combination of a ground working tool; a ground engaging foot-plate adapted to receive the weight of the operative to hold the same on the ground against traveling movement; and a propelling handle connected to the ground working tool for causing the foot plate to advance when the operative's weight is removed from the foot-plate and to cause the ground working tool to advance when the operative's weight is on the foot-plate.

In testimony whereof I affix my signature.

LEOPOLD URIGA.